UNITED STATES PATENT OFFICE.

HERMAN POOLE, OF BUFFALO, NEW YORK.

COMPOSITION FOR MAKING ARTIFICIAL STONE.

SPECIFICATION forming part of Letters Patent No. 343,198, dated June 8, 1886.

Application filed March 6, 1885. Renewed November 9, 1885. Serial No. 182,237. (Specimens.)

*To all whom it may concern:*

Be it known that I, HERMAN POOLE, a citizen of the United States, and a resident of Buffalo, in the county of Erie and State of New York, have invented certain Improvements in Composition for Making Artificial or Imitation Stone, of which the following is a specification.

My invention relates to that class of compositions of matter which are plastic or semi-liquid under the influence of heat, and may then be molded into artistic or other shapes, but are hard and resemble stone under ordinary temperatures; and my object is to produce a composition that may be cheaply and readily molded into the desired shapes, and that will take almost any tint or color desired. The articles molded from it resemble stone, and are very durable.

The essential ingredients of my composition are sulphur, ground pyrites, and ground stone. The proportions of these ingredients will vary somewhat with the character of the imitation stone one desires to produce; but a good result may be produced by mixing together one ton of sulphur, one ton of pyrites, and one and one-half ton of ground stone.

The proportion of ground stone in the compound may be varied—say from one to three tons—without injury; but the products produced will vary in appearance and texture somewhat.

In preparing my composition the sulphur is melted in a suitable vessel, and the pyrites then added by degrees, and the mixture stirred until they are dissolved. The ground stone is then gradually added, and the whole thoroughly mixed. It is of advantage to the manipulation to heat the pyrites and stone before they are added to the sulphur; but this is not essential. The mixing may be done before subjecting any of the ingredients to heat; but this does not produce very satisfactory results, and is not so easily managed.

I usually add to the above compound about half a ton of fine sand if I wish to give the product an appearance of sandstone or grit; and mineral pigments may be added in sufficient quantity to impart the tint and color desired. These, however, I do not consider essential to my invention.

I usually employ ordinary iron pyrites, but copper or other pyrites may be used. The kind of stone employed will depend upon the kind of stone one wishes to imitate to some extent. If I wish to imitate limestone, I employ limestone in the compound. For imitating granite, I employ coarsely-ground granite. For making an extra-hard imitation of sandstone, I sometimes add a proportion of emery.

By "ground stone" as an ingredient of my composition I mean to be understood that this substance, which forms the body of the compound, is of the character of stone. I include under this name such substances as chalk, spent lime, dried mortar, plaster-of-paris, sand, hydraulic cement, &c., all of which substances will serve as a body substance for my composition. I find that the addition of a little asphaltum or coal-tar pitch to my composition, mainly as a pigment, produces a fine dark-colored product.

I reserve to myself the exclusive right to the use of all substantial equivalents of my invention.

To form blocks or articles of my composition, it is poured into a suitable mold while in a molten or plastic state, and allowed to harden in cooling.

I claim as my invention—

1. The imitation stone herein described, the same comprising as its ingredients sulphur, ground pyrites, and a body material of the kind described, in substantially the proportions specified.

2. The imitation stone herein described, the same comprising as its ingredients sulphur, ground pyrites, ground stone, and sand, in substantially the proportions specified.

In witness whereof I have hereunto signed my name in the presence of two subscribing witnesses.

HERMAN POOLE.

Witnesses:
 ISAAC S. WILSON,
 GEO. M. KING.